(12) United States Patent
Linde et al.

(10) Patent No.: US 10,916,031 B2
(45) Date of Patent: Feb. 9, 2021

(54) SYSTEMS AND METHODS FOR OFFLOADING IMAGE-BASED TRACKING OPERATIONS FROM A GENERAL PROCESSING UNIT TO A HARDWARE ACCELERATOR UNIT

(71) Applicant: Facebook Technologies, LLC, Menlo Park, CA (US)

(72) Inventors: Oskar Linde, San Carlos, CA (US); Christian Forster, Baar (CH)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/028,728

(22) Filed: Jul. 6, 2018

(65) Prior Publication Data
US 2020/0013184 A1  Jan. 9, 2020

(51) Int. Cl.
*G09G 5/10* (2006.01)
*G06T 7/73* (2017.01)
(Continued)

(52) U.S. Cl.
CPC .............. *G06T 7/73* (2017.01); *G06T 1/20* (2013.01); *G06T 3/0093* (2013.01); *G06T 7/246* (2017.01); *G06T 2200/28* (2013.01)

(58) Field of Classification Search
CPC ....... G06T 19/006; G06T 19/00; G06F 3/011; G06F 3/012; G02B 27/017
(Continued)

(56) References Cited

U.S. PATENT DOCUMENTS

2012/0154579 A1  6/2012 Hampapur et al.
2014/0233800 A1  8/2014 Kis et al.
(Continued)

FOREIGN PATENT DOCUMENTS

EP        3 591 605 A1    1/2020
KR   10-2014-0103046 A    8/2014
WO      2020/009710 A1    1/2020

OTHER PUBLICATIONS

Baker, S., etc. Lucas-Kanade 20 Years On: A Unifying Framework: Part 1. Mar. 12, 2014 [online], Retrieved on Jul. 18, 2019. Retrieved from the Internet <URL: https://www.ri.cmu.edu/pub_files/pub3/baker_simon_2002_3/baker_simon_2002_3.pdf> (Year: 2014).*

(Continued)

*Primary Examiner* — Gordon G Liu
(74) *Attorney, Agent, or Firm* — FisherBroyles, LLP

(57) ABSTRACT

The disclosed computer-implemented method for offloading image-based tracking operations from a general processing unit to a hardware accelerator unit may include (1) sending imaging data from an imaging device to a hardware accelerator unit, and (2) directing the hardware accelerator unit to generate a multi-scale representation of the imaging data sent from the imaging device, (3) preparing a set of input data for a set of image-based tracking operations, and (4) directing the hardware accelerator unit to execute the set of image-based tracking operations using the generated multi-scale representation of the imaging data and the prepared set of input data. Various other methods, systems, and computer-readable media are also disclosed.

20 Claims, 8 Drawing Sheets

(51) Int. Cl.
*G06T 1/20* (2006.01)
*G06T 7/246* (2017.01)
*G06T 3/00* (2006.01)

(58) Field of Classification Search
USPC .......................................................... 345/633
See application file for complete search history.

(56) References Cited

U.S. PATENT DOCUMENTS

| | | | | |
|---|---|---|---|---|
| 2014/0378171 | A1* | 12/2014 | Rudow | H04W 4/027 |
| | | | | 455/456.6 |
| 2015/0049169 | A1* | 2/2015 | Krig | H04N 13/211 |
| | | | | 348/46 |
| 2015/0098645 | A1* | 4/2015 | Leung | G06F 16/786 |
| | | | | 382/154 |
| 2015/0145985 | A1* | 5/2015 | Gourlay | H04N 7/183 |
| | | | | 348/135 |
| 2016/0086336 | A1 | 3/2016 | Lin et al. | |
| 2017/0018086 | A1 | 1/2017 | Zhang | |
| 2018/0137651 | A1 | 5/2018 | Levinshtein et al. | |

OTHER PUBLICATIONS

Baker et al., "Part 1: The Quantity Approximated, the Warp Update Rule, and the Gradient Descent Approximation", Lucas-Kanade 20 Years On: A Unifying Framework, International Journal of Computer Vision, Jan. 2004, 54 pages.
Bloesch et al., "A Primer on the Differential Calculus of 3D Orientations." arXiv:1606.05285, accessed at https://arxiv.org/pdf/1606.05285.pdf, Oct. 31, 2016, 6 page.
Forster et al., "SVO: Semi-Direct Visual Odometry for Monocular and Multi-Camera Systems", IEEE Transactions on Robotics, vol. 33, Issued on Apr. 2, 2017, published on Dec. 14, 2016, pp. 249-265.
Leutenegger, Stefan, "Unmanned Solar Airplanes: Design and Algorithms for Efficient and Robust Autonomous Operation", Doctoral Dissertation, Swiss Federal Institute of Technology in Zurich (ETH Zurich), accessed at http://hdl.handle.net/10044/1/18247, published on Sep. 30, 2014, 181 pages.
Roumeliotis et al., "Stochastic cloning: A generalized framework for processing relative state measurements", Proceedings 2002 IEEE International Conference on Robotics and Automation, Washington, DC, May 2002, pp. 1788-1795.
Wikipedia, "Pyramid (image processing)", accessed at https://en.wikipedia.org/wiki/Pyramid_(image_processing), accessed on Mar. 29, 2018, 4 pages.
International Search Report and Written Opinion received for PCT Application Serial No. PCT/US2018/041329 dated Apr. 4, 2019, 14 pages.
Wlliams, Richard Michael, "Multi-robot Collaborative Visual Navigation with Micro Aerial Vehicles", Thesis submitted in accordance with the requirements of the University of Liverpool for the degree of Doctor in Philosophy, Apr. 30, 2017, 188 pages.
Hirabayashi et al., "Accelerated Deformable Part Models on GPUs", IEEE Transactions on Parallel and Distributed Systems, vol. 27, Issue 6, Jun. 1, 2016, pp. 1-14.
Extended European Search Report received for EP Patent Application Serial No. 19151883.6 dated Jun. 17, 2019, 12 pages.
Tomasi et al., "FPGA-DSP co-processing for feature tracking in smart video sensors", Journal of Real-Time Image Processing, Springer, vol. 11, No. 4, Mar. 28, 2014, 17 pages.
Sinha et al., "Feature tracking and matching in video using programmable graphics hardware", Machine Vision and Applications, Springer, vol. 22, No. 1, Nov. 9, 2007, 11 pages.
Starner et al., "Augmented Reality through Wearable Computing", Presence Teleoperators & Virtual Environments, vol. 6, No. 4, Aug. 1997, pp. 386-398.
Yilmaz et al., "Object Tracking: A Survey", ACM Computing Surveys, vol. 38, No. 4, Article 13, Dec. 1, 2006, pp. 1-45.
Communication Pursuant to Article 94(3) EPC received for EP Patent Application Serial No. 19151883.6 dated Jun. 3, 2020, 12 pages.
Jepson et al., "Robust Online Appearance Models for Visual Tracking", IEEE Conference on Computer Vision and Pattern Recognition, vol. 25, No. 10, Dec. 8, 2001, pp. I-415-I-422.

* cited by examiner

SYSTEMS AND METHODS FOR OFFLOADING IMAGE-BASED TRACKING OPERATIONS FROM A GENERAL PROCESSING UNIT TO A HARDWARE ACCELERATOR UNIT

BACKGROUND

Augmented reality (AR) and virtual reality (VR) systems may enable users to experience exciting events, such as interacting with people in a computer-generated simulation of a three-dimensional world or viewing data superimposed on a real-world view. Such "artificial reality" systems may also be used for purposes other than recreation. For example, governments may use them for military training simulations, doctors may use them to practice surgery, and engineers may use them as visualization aids.

Artificial reality systems often include multiple image sensors or cameras, either integrated within eyewear devices or headsets, or mounted to various external devices or accessories. Such systems may use imaging data from these image sensors to determine a position and/or orientation of a user, a user device, a head-mounted display (HMD), and/or other objects within an environment.

Despite incredible advances in such image-based tracking technology, traditional image-based tracking systems still have certain deficiencies that may negatively impact the overall user experience. For example, some traditional image-based tracking systems may require large amounts of processing and/or memory resources to accurately determine changes in position and/or orientation of tracked objects based on imaging data. These processing and/or memory resources are therefore dedicated to image-based tracking operations instead of other operations that may otherwise improve a user's artificial reality (e.g., AR/VR) experience, such as rendering of virtual and/or augmented environments, processing of video and/or audio data, and so forth.

SUMMARY

As will be described in greater detail below, the instant disclosure describes various systems and methods for offloading image-based tracking operations from a general processing unit (e.g., a central processing unit (CPU)) to a hardware accelerator unit. In some examples, the hardware accelerator unit may be a digital signal processor (DSP) (e.g., a general-purpose DSP, a special-purpose DSP, etc.) and/or an application-specific integrated circuit (ASIC). In at least one example, the DSP and/or the ASIC may be included in a system-on-a-chip (SoC) architecture and/or included in an HMD.

Offloading image-based tracking operations from a general processing unit to a hardware accelerator unit in accordance with the systems and methods described herein may conserve power resources, may efficiently distribute computing tasks among available computing hardware, and/or may free up the general processing unit to perform other computing tasks associated with providing an augmented reality experience to a user. Additional and/or alternative benefits will be made apparent in the following disclosure.

In one example, a computer-implemented method for offloading image-based tracking operations from a general processing unit to a hardware accelerator unit may include (1) sending imaging data from an imaging device to a hardware accelerator unit, and (2) directing the hardware accelerator unit to generate a multi-scale representation of the imaging data sent from the imaging device. In some examples, the method may further include (1) preparing a set of input data for a set of image-based tracking operations, and (2) directing the hardware accelerator unit to execute the set of image-based tracking operations using the generated multi-scale representation of the imaging data and the prepared set of input data.

In at least one example, the hardware accelerator unit may include at least one of a DSP or an ASIC. In some examples the hardware accelerator unit may be included in a SoC architecture.

In some embodiments, directing the hardware accelerator unit to generate the multi-scale representation of the imaging data sent from the imaging device may include directing the hardware accelerator unit to generate an image pyramid based on the imaging data sent from the imaging device.

In at least one embodiment, the set of image-based tracking operations may include at least one of (1) a patch matching operation, or (2) a corner detection operation. In some examples, the patch matching operation may include a zero-mean sum-of-squares distance (ZSSD) patch matching operation. In at least one example, the corner detection operation may include a Harris corner detection operation.

In at least one example, the set of image-based tracking operations may further include a subpixel alignment operation. In some examples, the subpixel alignment operation may include a two-dimensional inverse compositional Lucas-Kanade optimization.

In some examples, preparing the set of input data may include selecting a set of features expected to be included in the imaging data based on a pre-generated map of an environment and a predicted pose of the imaging device. In at least one example, preparing the set of input data may further include warping a patch of a keyframe based on a relative pose of the imaging device, a depth of an identified feature included in the keyframe, and a normal of a point included in the keyframe.

In at least one example, the computer-implemented method may further include determining whether an estimate of the normal of the point included in the keyframe is within a predetermined threshold. In some examples, when the estimate of the normal of the point included in the keyframe is within the predetermined threshold, warping the patch of the keyframe may be based on the estimate of the normal of the point included in the keyframe. In some examples, when the estimate of the normal of the point included in the keyframe is not within the predetermined threshold, warping the patch of the keyframe may include determining the normal of the point included in the patch of the keyframe based on an anticipated orientation of a new frame included in the imaging data relative to the keyframe.

In some embodiments, warping the patch of the keyframe may further include computing a scale representation of the imaging data included in the multi-scale representation of the imaging data to utilize in a patch matching operation.

In some embodiments, the hardware accelerator unit may be configured to receive the imaging data from the imaging device, generate the multi-scale representation of the imaging data, and execute the set of image-based tracking operations as part of a set of operations performed by a tracker thread in a multi-threaded architecture. In some examples, the method may further include executing the tracker thread at an operational frequency of an input power source.

In addition, a corresponding system for offloading image-based tracking operations from a general processing unit to a hardware accelerator unit may include a HMD device that may include an imaging device and a hardware accelerator unit. In at least one example, the hardware accelerator unit may include a DSP and/or an ASIC.

The system may further include an image-based tracking subsystem that may include several modules stored in memory, including (1) a sending module that sends imaging data from the imaging device to the hardware accelerator unit, and (2) a generating module that directs the hardware accelerator unit to generate a multi-scale representation of the imaging data sent from the imaging device. In some examples, the image-based tracking subsystem may further include (1) a preparing module that prepares a set of input data for a set of image-based tracking operations, and (2) an executing module that directs the hardware accelerator unit to execute the set of image-based tracking operations using the generated multi-scale representation of the imaging data and the prepared set of input data. In at least one example, the image-based tracking subsystem may further include at least one physical processor that executes the sending module, the generating module, the preparing module, and the executing module.

In at least one example, the set of image-based tracking operations may include at least one of (1) a patch matching operation, (2) a corner detection operation, or (3) a sub-pixel alignment operation.

In some examples, the preparing module may prepare the set of input data by (1) selecting a set of features expected to be included in the imaging data based on a pre-generated map of an environment and a predicted pose of the imaging device, and (2) warping a patch of a keyframe based on a relative pose of the imaging device, a depth of an identified feature included in the keyframe, and a normal of a point included in the keyframe.

In some examples, the above-described method may be encoded as computer-readable instructions on a computer-readable medium. For example, a computer-readable medium may include one or more computer-executable instructions that, when executed by at least one processor of a computing device, may cause the computing device to (1) send imaging data from an imaging device to a hardware accelerator unit, and (2) direct the hardware accelerator unit to generate a multi-scale representation of the imaging data sent from the imaging device.

In at least one example, the computer-readable medium may further include one or more computer-executable instructions that, when executed by the processor of the computing device, may cause the computing device to (1) prepare a set of input data for a set of image-based tracking operations, and (2) direct the hardware accelerator unit to execute the set of image-based tracking operations using the generated multi-scale representation of the imaging data and the prepared set of input data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
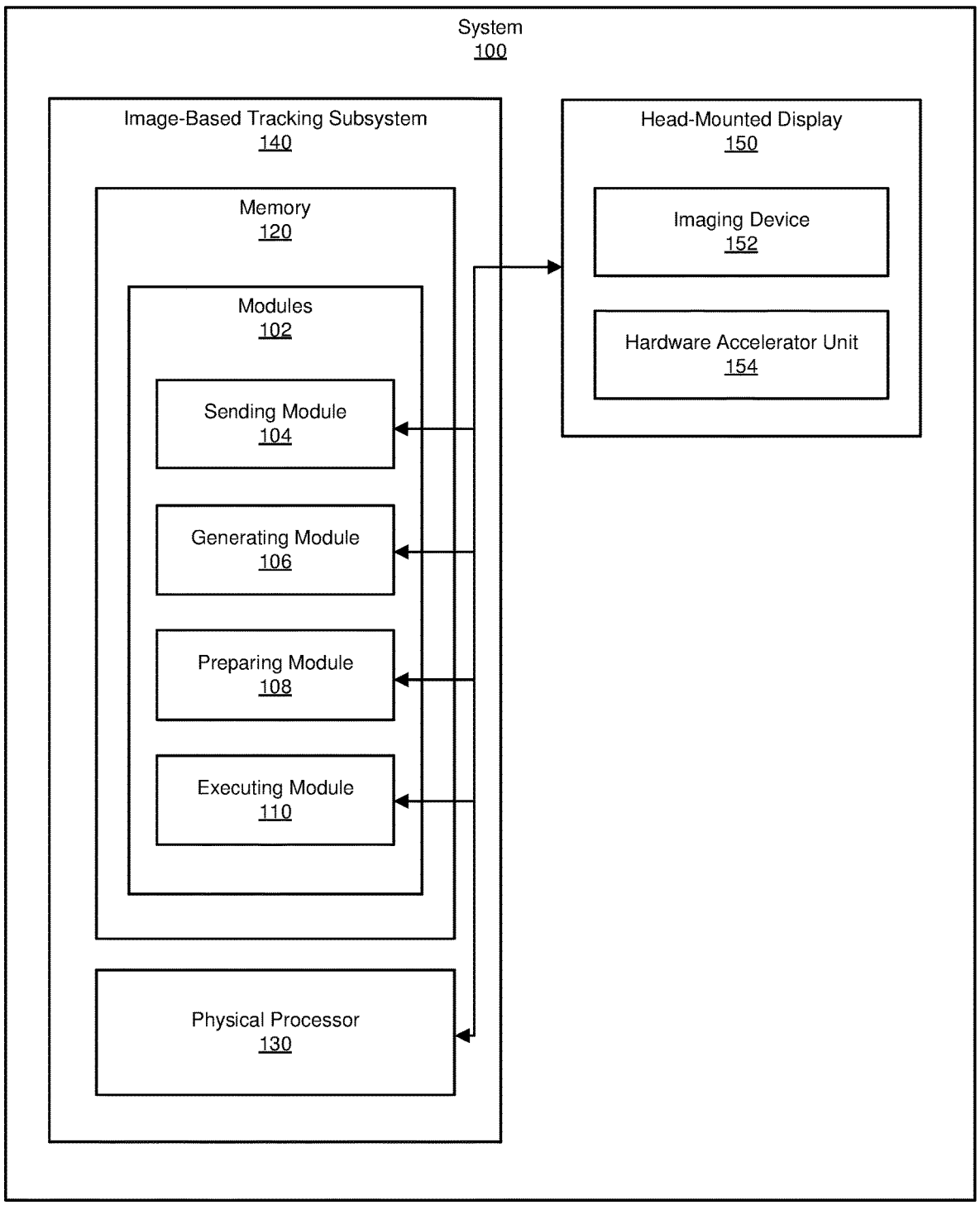
FIG. 1 is a block diagram of an example system for offloading image-based tracking operations from a general processing unit to a hardware accelerator unit.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for offloading image-based tracking operations from a general processing unit to a hardware accelerator unit. As will be explained in greater detail below, embodiments of the instant disclosure may send imaging data (e.g., one or more images, image metadata associated with one or more images, etc.) from an imaging device (e.g., a camera capable of gathering light information in at least one portion of the electromagnetic spectrum) to a hardware accelerator unit, such as a DSP (e.g., a general-purpose and/or a purpose-built DSP) and/or an ASIC. In some examples, the hardware accelerator unit may be included within a SoC architecture that may also include one or more general processing units (e.g., a CPU, a graphics processing unit (GPU), etc.).

An embodiment may also direct the hardware accelerator unit to generate a multi-scale representation of the imaging data sent from the imaging device, such as an image pyramid. Such an image pyramid may represent multiple scales (e.g., sizes and/or resolutions) of the imaging data that may be used in various image-based tracking operations.

In some examples, an embodiment may also prepare a set of input data for a set of image-based tracking operations. An embodiment may then direct the hardware accelerator unit to execute the set of image-based tracking operations using the generated multi-scale representation of the imaging data and the prepared set of input data.

By sending imaging data to a hardware accelerator unit, directing the hardware accelerator unit to generate a multi-scale representation of the imaging data, preparing a set of input data for a set of image-based tracking operations, and directing the hardware accelerator unit to execute the set of image-based tracking operations, the systems and methods described herein may effectively offload these potentially costly image-based tracking operations from a general processing unit (e.g., a CPU, a GPU, etc.) to a hardware accelerator unit, such as a DSP and/or an ASIC. This may free up computing resources (e.g., processing resources) for other uses, such as generating an artificial environment, communicating with other computing devices, and so forth.

Additionally, in some examples, a suitable hardware accelerator unit (e.g., a DSP and/or an ASIC) may already be included in a SoC architecture utilized by conventional artificial reality systems and/or conventional HMDs. The hardware accelerator unit may otherwise be under-utilized by such conventional systems. Hence, offloading image-based tracking operations from a general processing unit to a hardware accelerator unit as described herein may provide for a more efficient utilization of such existing hardware computing resources.

The following will provide, with reference to FIGS. 1-2 and 4-8, detailed descriptions of systems for offloading image-based tracking operations from a general processing unit to a hardware accelerator unit. Detailed descriptions of corresponding computer-implemented methods will also be provided in connection with FIG. 3.

FIG. 1 is a block diagram of an example system 100 for offloading image-based tracking operations from a general processing unit to a hardware accelerator unit. As illustrated in this figure, example system 100 may include one or more modules 102 for performing one or more tasks. As will be explained in greater detail below, modules 102 may include a sending module 104 that may send imaging data from an imaging device to a hardware accelerator unit and a generating module 106 that may direct the hardware accelerator unit to generate a multi-scale representation of the imaging data sent from the imaging device. Example system 100 may further include a preparing module 108 that may prepare a set of input data for a set of image-based tracking operations, and an executing module 110 that may direct the hardware accelerator unit to execute the set of image-based tracking operations using the generated multi-scale representation of the imaging data and the prepared set of input data.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further shown in FIG. 1, example system 100 may also include one or more physical processors, such as physical processor 130. Physical processor 130 generally represents any type or form of hardware-implemented general processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate offloading image-based tracking operations from a general processing unit (e.g., physical processor 130) to a hardware accelerator unit. Examples of physical processor 130 may include, without limitation, microprocessors, microcontrollers, CPUs, Field-Programmable Gate Arrays (FPGAs) that implement softcore processors, ASICs, portions of one or more of the same, variations or combinations of one or more of the same, or any other suitable physical processor.

As further illustrated in FIG. 1, memory 120 and physical processor 130 may be included as parts of an image-based tracking subsystem 140. Image-based tracking subsystem 140 may be any suitable system that may be included as part of system 100 and that may be configured to use imaging data to track a position and/or orientation of an object within an environment.

In some embodiments, as further shown in FIG. 1, image-based tracking subsystem 140 may be in communication with an HMD 150. In some examples, the terms "head-mounted display" and "head-mounted display device" may generally refer to any type or form of display device or system that is configured to be worn on or about a user's head and that is configured to display visual content to the user. Head-mounted displays may display content in any suitable manner, including via a display screen (e.g., a liquid crystal display (LCD) screen, a light-emitting diode (LED) display screen, or organic LED (OLED) display screen), a projector, a cathode ray tube, an optical mixer, etc. Head-mounted displays may display content in one or more of various media formats. For example, a head-mounted display may display video, photos, and/or computer-generated imagery (CGI). HMD 150 may further include, as will be described in greater detail below, an imaging device 152 and a hardware accelerator unit 154. In some examples, image-based tracking subsystem 140 may be included as part of (e.g., within a common housing with) HMD 150. In other examples, image-based tracking subsystem 140 (or any component thereof) may be external to and/or not physically connected to HMD 150, and may communicate with HMD 150 via one or more wireless protocols.

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Head-mounted displays may be configured to be mounted to a user's head in a number of ways. Some head-mounted displays may be incorporated into glasses or visors. Other head-mounted displays may be incorporated into helmets, hats, or other headwear.

Figure 2:
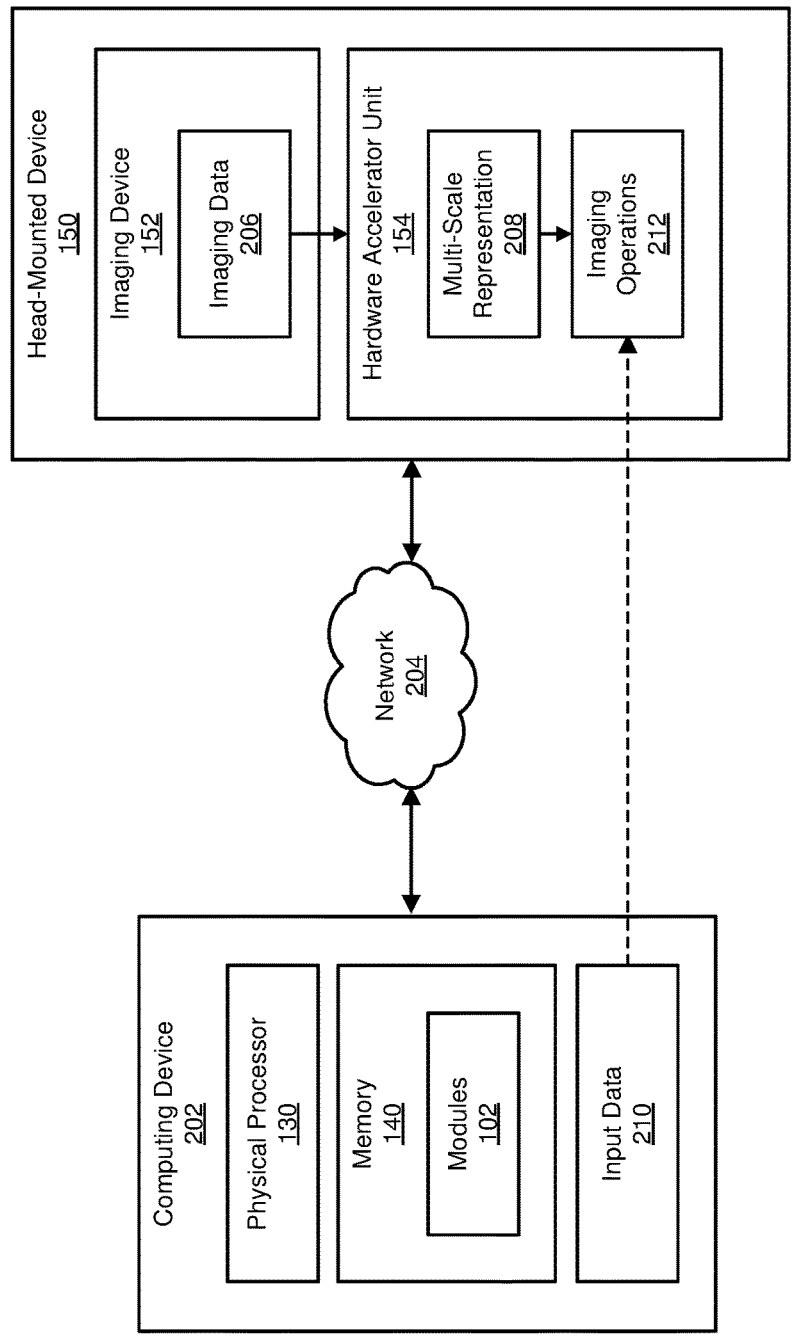
FIG. 2 is a block diagram of an example implementation of a system for offloading image-based tracking operations from a general processing unit to a hardware accelerator unit.

Example system 100 in FIG. 1 may be implemented in a variety of ways. For example, all or a portion of example system 100 may represent portions of an example system 200 ("system 200") in FIG. 2. As shown in FIG. 2, system 200 may include computing device 202 in communication with HMD 150 via network 204. In at least one example, computing device 202 may be programmed with one or more of modules 102. Additionally or alternatively, HMD 150 may be programmed with one or more of modules 102.

In at least one embodiment, one or more modules 102 from FIG. 1 may, when executed by computing device 202 and/or HMD 150, enable computing device 202 and/or HMD 150 to perform one or more operations to offload image-based tracking operations from a general processing unit to a hardware accelerator unit. For example, as will be described in greater detail below, sending module 104 may cause computing device 202 and/or HMD 150 to send imaging data (e.g., imaging data 206) from an imaging device (e.g., imaging device 152) to a hardware accelerator unit (e.g., hardware accelerator unit 154). In some embodiments, generating module 106 may cause computing device 202 and/or HMD 150 to direct the hardware accelerator unit (e.g., hardware accelerator unit 154) to generate a multi-scale representation of the imaging data (e.g., multi-scale representation 208) sent from the imaging device (e.g., imaging device 152).

Furthermore, in some examples, preparing module 108 may cause computing device 202 and/or HMD 150 to prepare a set of input data (e.g., input data 210) for a set of image-based tracking operations (e.g., tracking operations 212). Additionally, in some examples, executing module 110 may direct the hardware accelerator unit (e.g., hardware accelerator unit 154) to execute the set of image-based tracking operations (e.g., tracking operations 212) using the generated multi-scale representation of the imaging data (e.g., multi-scale representation 208) and the prepared set of input data (e.g., input data 210).

Computing device 202 generally represents any type or form of computing device capable of reading and/or executing computer-executable instructions. In at least one embodiment, computing device 202 may accept one or more directions from HMD 150. Examples of computing device 202 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable computing device.

Network 204 generally represents any medium or architecture capable of facilitating communication and/or data transfer between computing device 202 and/or HMD 150. Examples of network 204 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, one or more proprietary data connections, and the like. Network 204 may facilitate communication or data transfer using wireless or wired connections. In one embodiment, network 204 may facilitate communication between computing device 202 and HMD 150.

In at least one example, computing device 202 and HMD 150 may be computing devices programmed with one or more of modules 102. All or a portion of the functionality of modules 102 may be performed by computing device 202, HMD 150, and/or any other suitable computing system. As will be described in greater detail below, one or more of modules 102 from FIG. 1 may, when executed by at least one processor of computing device 202 and/or HMD 150 to offload image-based tracking operations from a general processing unit to a hardware accelerator unit.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
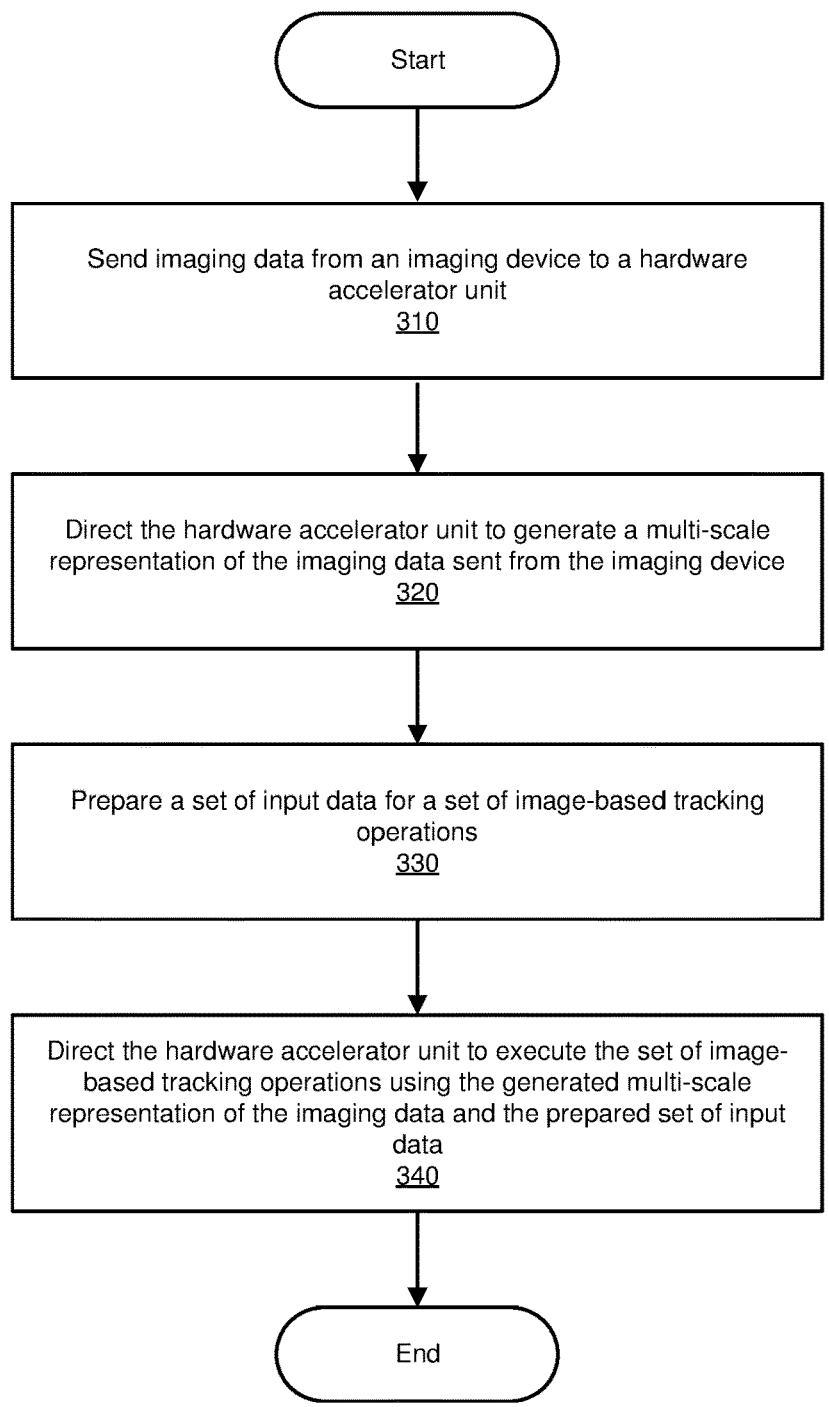
FIG. 3 is a flow diagram of an example method for offloading image-based tracking operations from a general processing unit to a hardware accelerator unit.

FIG. 3 is a flow diagram of an example computer-implemented method 300 for offloading image-based tracking operations from a general processing unit to a hardware accelerator unit. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may send imaging data from an imaging device to a hardware accelerator unit. For example, sending module 104 may cause computing device 202 and/or HMD 150 to send imaging data 206 from imaging device 152 to hardware accelerator unit 154.

Imaging device 152 may include any suitable device that may collect imaging data 206 associated with an environment. For example, imaging device 152 may include, without limitation, a visible-light camera, an infrared camera, a thermal camera, a radar sensor, and so forth. In some examples, imaging device 152 may include a camera included in an HMD (e.g., HMD 150) and in communication with an image-based tracking system (e.g., image-based tracking subsystem 140). In at least one example, imaging device 152 may be included in a plurality of imaging devices included in and/or otherwise in communication with an image-based tracking system (e.g., image-based tracking subsystem 140).

In some embodiments, imaging device 152 may include a traditional image sensor (e.g., a camera), such that the signals captured by imaging device 152 and represented by imaging data 206 may include two-dimensional imaging data (e.g., imaging data having no depth information). In some embodiments, imaging device 152 may transmit corresponding imaging data to another device, such as one or more components of image-based tracking subsystem 140, which may determine and/or generate depth information using the imaging data 206 from imaging device 152.

Hardware accelerator unit 154 may include any suitable hardware device to which image-based tracking operations may be offloaded from a general processing unit (e.g., physical processor 130). In some examples, hardware accelerator unit 154 may include a DSP and/or an ASIC included in a SoC architecture.

In some examples, a "digital signal processor" may include any hardware device that implements a specialized instruction set and/or hardware architecture to accelerate digital signal processing operations including, without limitation, high-speed (e.g., real-time) processing (e.g., measuring, filtering, compressing, etc.) of numeric data representative of analog signals. In at least one example, a DSP may be configured to perform such digital signal processing operations with better performance, lower latency, and reduced power constraints than a general processing unit. In at least some embodiments, a digital signal processor may include a vector unit and/or a set of vector instructions configured to accelerate vector operations.

In some examples, an "application-specific integrated circuit" may include any integrated circuit customized for a particular use. In at least one example, an ASIC may be configured to perform specific processing operations (e.g., vector operations) with better performance, lower latency, and reduced power constraints than a general processing unit.

Additionally, in some examples, a "system-on-a-chip" and/or a "system-on-a-chip architecture" may include a computing architecture and/or device that integrates computing components within a single integrated circuit and/or substrate. In some embodiments, a SOC architecture may include, without limitation, a general processing unit, a hardware accelerator unit (e.g., a DSP, an ASIC, etc.), a memory device, a GPU, and so forth, integrated within a single integrated circuit and/or substrate.

Sending module 104 may cause computing device 202 and/or HMD 150 to send imaging data 206 from imaging device 152 to hardware accelerator unit 154 in any suitable way. For example, imaging device 152 may capture imaging data 206 that may characterize a scene or local area surrounding some or all of imaging device 152 and/or HMD 150. Sending module 104 may then cause HMD 150 to send imaging data 206 to hardware accelerator unit 154 via a suitable data connection (e.g., an internal bus, a peripheral bus, one or more components of network 204, etc.) from imaging device 152 to hardware accelerator unit 154.

Returning to FIG. 3, at step 320, one or more of the systems described herein may direct a hardware accelerator unit to generate a multi-scale representation of imaging data sent from an imaging device. For example, generating module 106 may cause computing device 202 and/or HMD 150 to direct hardware accelerator unit 154 to generate multi-scale representation 208 of imaging data 206 sent from imaging device 152.

Generating module 106 may cause computing device 202 and/or HMD 150 to direct hardware accelerator unit 154 to generate multi-scale representation 208 of imaging data 206 sent from imaging device 152 in a variety of contexts. For example, generating module 106 may cause computing device and/or HMD 150 to direct hardware accelerator unit 154 to generate an image pyramid based on imaging data 206.

In some examples, an "image pyramid" may include one or more low-pass filtered, reduced density (e.g., down-sampled) images of a preceding level of the image pyramid, where the base level may be defined as an original image (e.g., a two-dimensional image captured by an imaging device such as imaging device 152).

In addition, a base level of an image pyramid may be an image that has been preprocessed in accordance with any suitable image manipulation process and/or technique. For example, one or more of the systems described herein (e.g., one or more of modules 102) may apply a Gaussian blur function to an image captured by imaging device 152 in order to suppress aliasing artifacts that may be present in the original image. One or more of the systems described herein (e.g., one or more of modules 102) may then designate the blurred image as a base level for an image pyramid.

In some examples, an image pyramid may be defied recursively in accordance with the following statements:

$$G_0(x,y)=I(x,y), \text{ for level } l=0 \text{ and}$$

$$G_l(x,y)=\Sigma_{m=-1}^{1}\Sigma_{n=-1}^{1}w(m,n)G_{l-1}(2x+m,2y+n),$$

where w(m,n) is a weighting function. The weighting function may be separable and/or symmetric and may contribute the same total weight to nodes at levels l+1. Such image pyramids may be referred to as Gaussian image pyramids. In other examples, each element of an image pyramid may represent an average (e.g., a local average) obtained with an equivalent weighting function applied to the original image. In such examples, the image pyramid may contain local averages at various scales.

Figure 4:
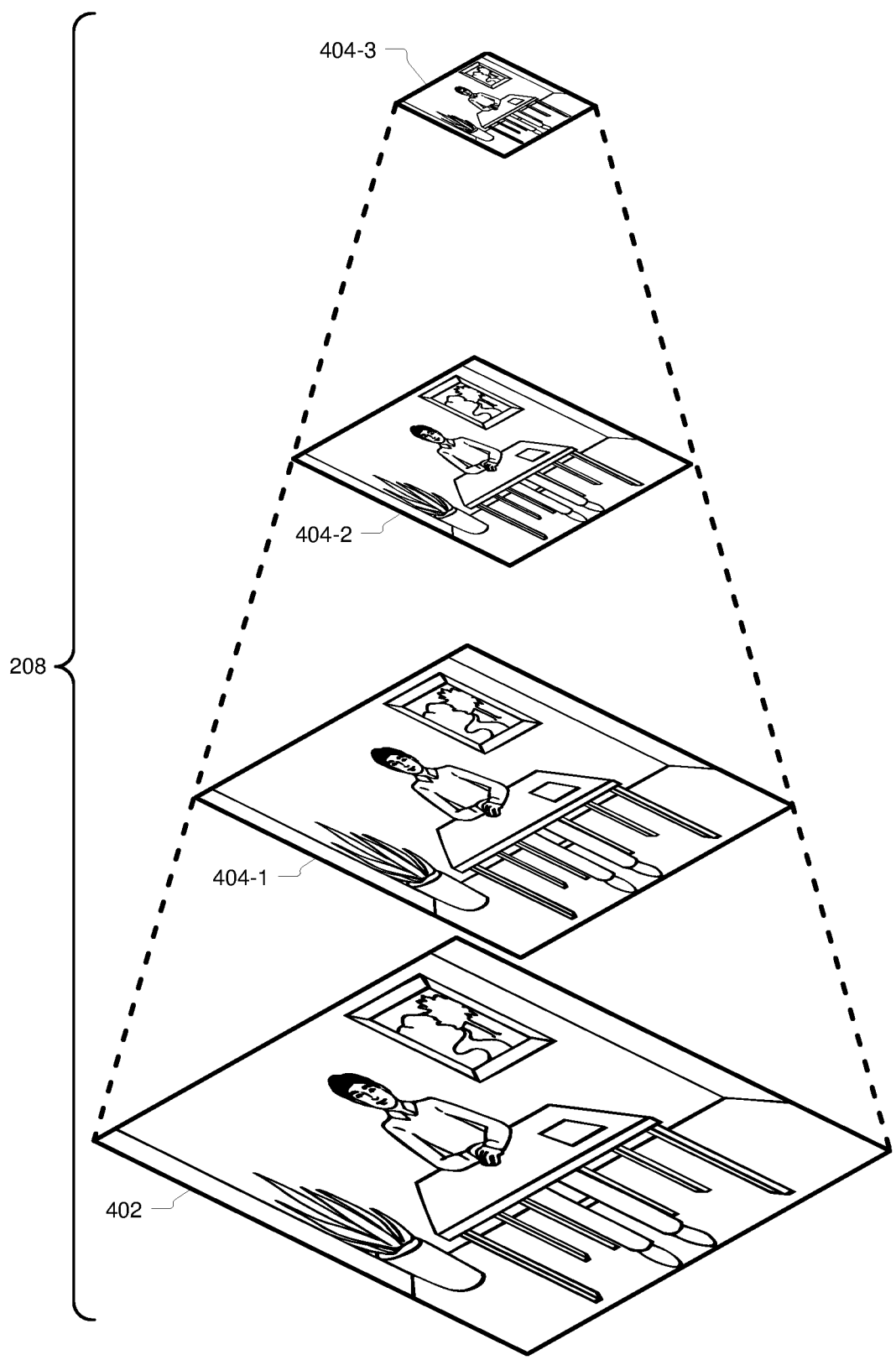
FIG. 4 illustrates an example of directing a hardware accelerator unit to generate a multi-scale representation of imaging data sent from an imaging device.

By way of illustration, FIG. 4 shows an example of directing a hardware accelerator unit to generate a multi-scale representation of imaging data sent from an imaging device. As shown, FIG. 4 shows an example of multi-scale representation 208 that includes an image pyramid with four levels. Level 402 may represent a portion of imaging data 206 (e.g., a two-dimensional image captured by imaging device 152 and sent to hardware accelerator unit 154). FIG. 4 further shows levels 404 (e.g., levels 404-1 through 404-3) that each represent a progressively down-sampled version of level 402. For example, level 404-1 may represent a down-sampled version of level 402, level 404-2 may represent a down-sampled version of level 404-1, and so forth. Additionally or alternatively, level 404-1 may represent a version of level 402 with a first down-sampling function applied to level 402, level 404-2 may represent a version of level 402 with a second down-sampling function applied to level 402, and so forth.

Generating module 106 may direct hardware accelerator unit 154 to generate multi-scale representation 208 in any suitable way. For example, having received imaging data 206 from imaging device 152, hardware accelerator unit 154 may smooth an image included in imaging data 206 and down-sample it multiple times to get an image pyramid of multiple levels. In at least one example, hardware accelerator unit 154 may down-sample an image included in imaging data 206 three times to get an image pyramid of four levels. In some examples, hardware accelerator unit 154 may smooth the image via a convolution with a multi-dimensional (e.g., three-by-three, four-by-four, five-by-five, etc.) kernel. Hence, in at least one example, hardware accelerator unit 154 may create an image pyramid from imaging data 206 by consecutively smoothing and down-sampling (e.g., with a suitable down-sample ratio, such as 2) imaging data 206 with a three-by-three (3×3) down-sample kernel.

Hardware accelerator unit 154 may execute these operations (e.g., smoothing, down-sampling, aggregating, etc.) by executing one or more instructions included in an instruction set associated with hardware accelerator unit 154. For example, hardware accelerator unit 154 may be configured to efficiently execute various vector operations, such as multiplication (e.g., halfwords, word by half, vector reduce, and/or dual multiply), arithmetic and/or logical shifts on word and/or half-word data, automatic scaling, and so forth. Hardware accelerator unit 154 may utilize one or more of these efficient vector operations to generate multi-scale representation 208 from imaging data 206. Hence, the convolution described above (e.g., smoothing an image included in imaging data 206 by convolution with a 3×3 kernel) may be efficiently implemented on hardware accelerator unit 154.

Returning to FIG. 3, at step 330, one or more of the systems described herein may prepare a set of input data for a set of image-based tracking operations. For example, preparing module 108 may cause computing device 202 and/or HMD 150 to prepare input data 210 for tracking operations 212.

In some examples, an "image-based tracking operation" may include any operation that may be used to determine a position of a point within an environment. As will be described in greater detail below, an image-based tracking operation may include, without limitation, generation of an image pyramid, a patch matching operation, a subpixel alignment operation, a corner detection operation, a gamma correction operation (e.g., a gamma compression operation, a gamma expansion operation, etc.) and so forth. In some examples, input data 210 may include any data that hardware accelerator unit 154 may utilize in order to execute one or more image-based tracking operations.

Preparing module 108 may cause computing device 202 and/or HMD 150 to prepare input data 210 for tracking operations 212 in a variety of contexts. For example, preparing module 108 may cause computing device 202 and/or HMD 150 to prepare input data 210 for tracking operations 212 by selecting a set of features expected to be included in imaging data 206. For example, preparing module 108 may receive (e.g., read, access, obtain, etc.) data representative of a map of an environment and a predicted pose of a tracked object (e.g., HMD 150), and determine a set of points that may be expected to be visible within imaging data 206 (e.g., a two-dimensional image included in imaging data 206) based on the map and the predicted pose.

Additionally, in some examples, preparing module 108 may select and/or receive a keyframe (e.g., an identifier associated with a keyframe), and may search an adjacency graph of the keyframe to identify one or more additional keyframes with fields of view that may overlap the keyframe. Based on the keyframe and the additional keyframes, preparing module 108 may determine a set of points that may be visible from the keyframes. Preparing module 108 may then project the determined set of points into the predicted camera pose's frame. Preparing module 108 may then determine whether the set of points is projected to be within the boundaries of an image included in imaging data 206. Points that are successfully projected to be within the boundaries of an image included in imaging data 206 may then be stored and/or passed as part of input data 210 to hardware acceleration unit 154. In some examples, a "keyframe" may include any frame included in a digital video stream (e.g., included in imaging data 206 from imaging device 152) that may be decoded without reference to another frame.

Figure 5:
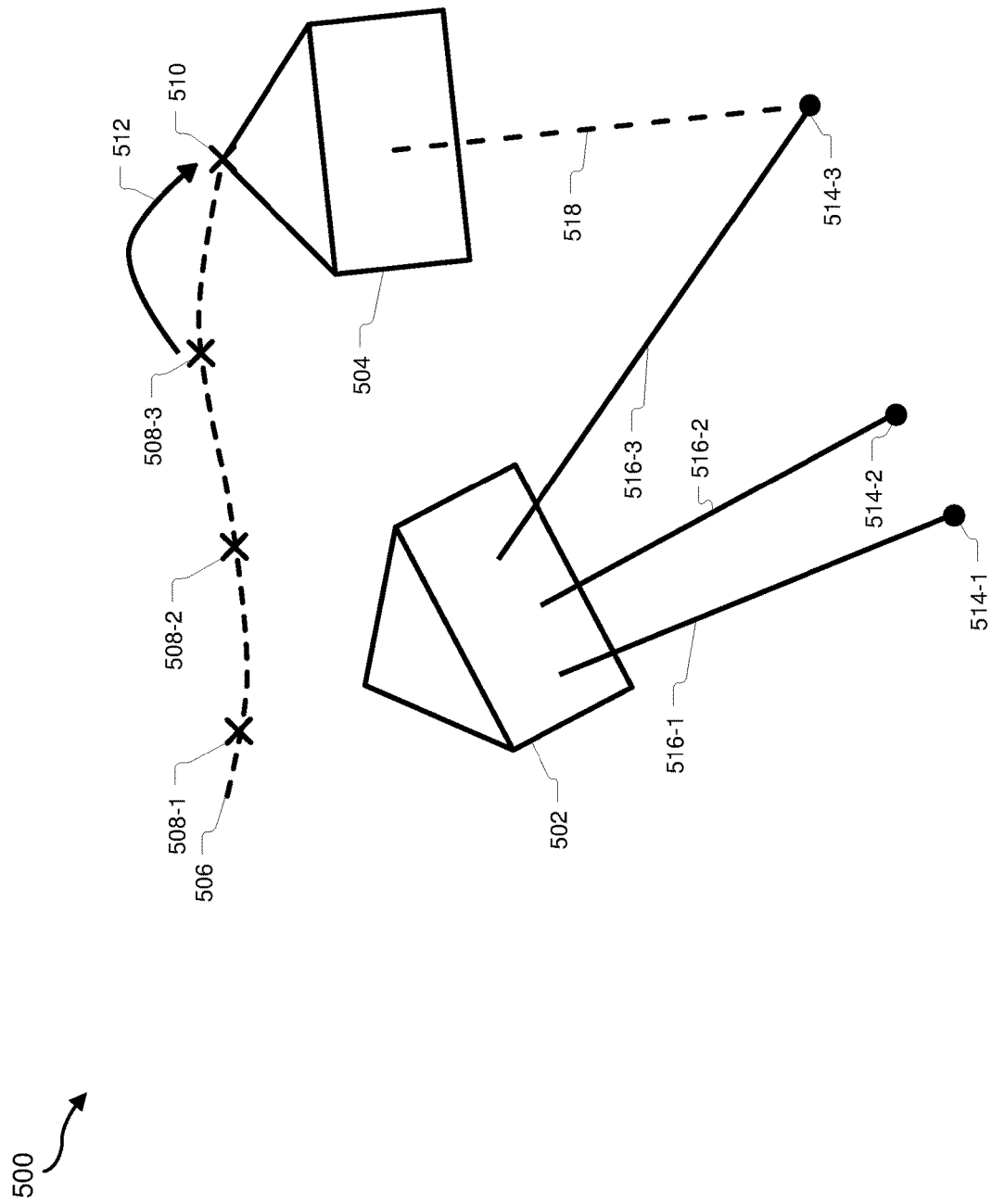
FIG. 5 illustrates an example of preparing a set of input data for a set of image-based tracking operations by selecting a set of features expected to be included in imaging data based on a pre-generated map of an environment and a predicted pose of an imaging device.

By way of illustration, FIG. 5 shows a view 500 of preparing a set of input data for a set of image-based tracking operations by selecting a set of features expected to be included in imaging data based on a pre-generated map of an environment and a predicted pose of an imaging device. As shown, FIG. 5 includes a keyframe 502 and a projected frame 504. As described above, keyframe 502 may be a keyframe that preparing module 108 has determined to be the closest (e.g., in time, in spatial distance, etc.) to a current frame that may be included in imaging data 206. Projected frame 504 may represent an estimation of the current frame based on a predicted pose of imaging device 152. Path 506 may represent a path of a tracked object (e.g., HMD 150) through an environment, and positions 508 (e.g., positions 508-1 through 508-3) may represent previously determined positions of the tracked object (e.g., HMD 150) and/or previous frames of imaging data used to determine previous positions of the tracked object within an environment.

As further shown in FIG. 5 predicted position 510 indicates that preparing module 108 has predicted, based on inertial data 512 gathered from one or more inertial measurement units (IMU) associated with the tracked object (e.g., HMD 150), a predicted position and/or orientation of the tracked object (e.g., HMD 150) associated with the projected frame 504.

Points 514 (e.g., points 514-1 through 514-3) may be points included in keyframe 502. Points 514 may be further associated with an environment, and may be included in a map of the environment. Depth indicators 516 (e.g., depth indicators 516-1 through 516-2) associated with points 514 may represent determined depths of points 514 relative to a determined position of an imaging device (e.g., imaging device 152) at a time that the imaging device captured keyframe 502. Projected depth indicator 518 may represent a projected depth of point 514-3 within projected frame 504.

Hence, as illustrated by FIG. 5, preparing module 108 may determine that points 514 (e.g., points 514-1 through 514-3) are visible within keyframe 502. Preparing module 108 may then project points 514 into projected frame 504, and determine that point 514-3 is projected to be within the boundaries of projected frame 504. Hence, preparing module 108 may include data associated with point 514-3 (e.g., a projected position of point 514-3 within an image included in imaging data 206, a projected depth of point 514-3 relative to a position of imaging device 152 at a time that imaging device 152 captures imaging data 206, etc.) as part of input data 210, and may direct hardware acceleration unit 154 to execute one or more image-based tracking operations using data associated with point 514-3.

Additionally, preparing module 108 may further prepare input data 210 for tracking operations 212 by warping a patch of a keyframe based on a relative pose of the imaging device, a depth of an identified feature included in the keyframe, and a normal of a point included in the keyframe. For example, each identified feature included in a map of an environment (e.g., each point) may be associated with a set of previous frames that an image-based tracking device may have previously used to triangulate the identified feature. Preparing module 108 may select a keyframe associated with an identified feature that may be closest (e.g., in time, in space relative to an imaging device and/or tracked object, in content, etc.) to a current frame that may be anticipated to be included in imaging data 206, and may warp a patch of the keyframe into the current frame. In some examples, preparing module 108 may warp the patch of the keyframe into the current frame in accordance with an affine transformation operation. Preparing module 108 may include information representative of the warped patch as part of input data 210.

In some examples, preparing module 108 may warp the patch of the keyframe by determining whether an estimate of the normal of the point included in the patch of the keyframe is within a predetermined threshold. When the estimate of the normal of the point included in the keyframe is within the predetermined threshold, warping the patch of the keyframe may be based on the estimate of the normal of the point included in the keyframe. In some examples, a "normal" or "normal of a point" may include a vector that is perpendicular to a tangent plane that includes the point.

Figure 6B:
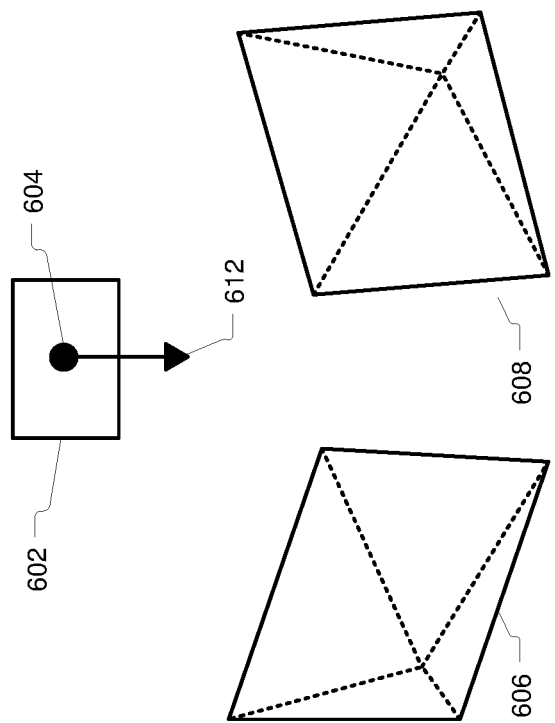
FIGS. 6A and 6B illustrate examples of preparing a set of input data by warping a patch of a keyframe based on a relative pose of an imaging device, a depth of an identified feature included in the keyframe, and a normal of a point included in the keyframe.
Figure 6A:
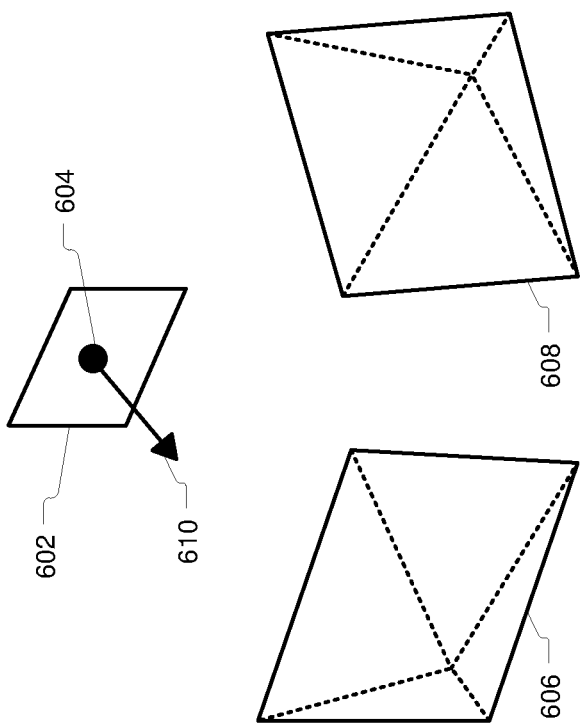

By way of illustration, FIG. 6A shows a patch 602 that includes a point 604. In this illustration, patch 602 may be included in keyframe 606, which may be a keyframe that is closest to a current frame 608 that may be anticipated to be included in imaging data 206. As shown, current frame 608 (and thus HMD 150 and/or imaging device 152) has a pose relative to a pose of keyframe 606 that one or more of the systems described herein (e.g., preparing module 108) may predict and/or estimate based on one or more measurements taken by an IMU associated with HMD 150 and/or imaging device 152, a map of the environment that includes previously determined positions and/or orientations of HMD 150 and/or imaging device 152 within the environment, previously determined positions within the environment of one or more features included in one or more images of the environment, and so forth.

As further shown in FIG. 6A, point 604 may have an associated estimated normal 610. Preparing module may determine that estimated normal 610 is within a predetermined threshold (e.g., that the estimate of the normal of point 604 indicated by estimated normal 610 is of a sufficient accuracy, within an acceptable range, estimated based on a sufficient amount and/or quality of input data, etc.). In this example, preparing module 108 may warp patch 602 into current frame 608 based on the pose of the keyframe, the pose (e.g., the predicted pose) of the current frame, and estimated normal 610.

In other examples, a normal of point 604 may be unknown (e.g., an estimate of a normal of point 604 may be below a predetermined threshold). In such examples, preparing module 108 may determine a normal of point 604 (e.g., determined normal 612) based on the anticipated, predicted, and/or estimated pose of current frame 608 relative to keyframe 606 (e.g., a pose of keyframe 606). Hence, as shown in FIG. 6B, preparing module 108 may determine determined normal 612 by determining that a normal of point 604 is oriented toward a point in space between keyframe 606 and current frame 608.

Additionally, in some examples, warping the patch of the keyframe may include computing a scale representation of imaging data 206 included in multi-scale representation 208 to utilize in a patch matching operation. Preparing module 108 may then include, within input data 210, information indicating at least a portion (e.g., at least a patch) of a scale representation included in multi-scale representation 208 that corresponds to the computed scale representation (e.g., a direction to utilize a patch of a particular level of an image pyramid in a patch matching operation).

By preparing input data 210 for tracking operations 212, the systems and methods described herein may execute one or more operations in preparation for directing hardware accelerator unit 154 to execute one or more image-based tracking operations. This may efficiently allocate to a general processing unit (e.g., physical processor 130) certain operations that may not be efficiently performed by hardware accelerator unit 154. Preparing input data 210 may also effectively enable hardware accelerator unit 154 to use input data 210 to execute image-based tracking operations that may be efficiently performed by hardware accelerator unit 154.

Additionally, although described above as being executed by a general-purpose processor (e.g., physical processor 130), in some embodiments, one or more of the operations described above in relation to preparing of input data 210 may be executed by hardware accelerator unit 154. For example, in at least one embodiment, one or more of the systems described herein (e.g., preparing module 108) may direct hardware accelerator unit 154 to select a set of features expected to be included in imaging data 206 and/or warp a patch of a keyframe in any suitable way, such as any of the ways described herein. In such examples, hardware accelerator unit 154 may be configured to efficiently execute such operations in addition to one or more image-based tracking operations.

Returning to FIG. 3, at step 340, one or more of the systems described herein may direct a hardware accelerator unit to execute a set of image-based tracking operations using a generated multi-scale representation of imaging data and a prepared set of input data. For example, executing module 110 may cause computing device 202 and/or HMD 150 to direct hardware accelerator unit 154 to execute tracking operations 212 using multi-scale representation 208 and input data 210.

In some examples, a set of image-based tracking operations may include any operation that may enable an image-based tracking system (e.g., image-based tracking subsystem 140) to identify, localize, and/or determine a position and/or orientation of, a tracked object within an environment. In some examples, as will be described in greater detail below, a set of image-based tracking operations may include, without limitation, a patch matching operation, a corner detection operation, a subpixel alignment operation, and/or a gamma correction operation (e.g., a gamma compression operation, a gamma expansion operation, etc.).

In some examples, a "patch matching operation" may be any operation that may correlate a portion of an image with another portion of an additional image. For example, a zero-mean sum-of-squared differences (ZSSD) operation may correlate a portion of an image (e.g., a warped patch of a keyframe) and another portion of an additional image (e.g., an image included in imaging data 206).

Figure 7:
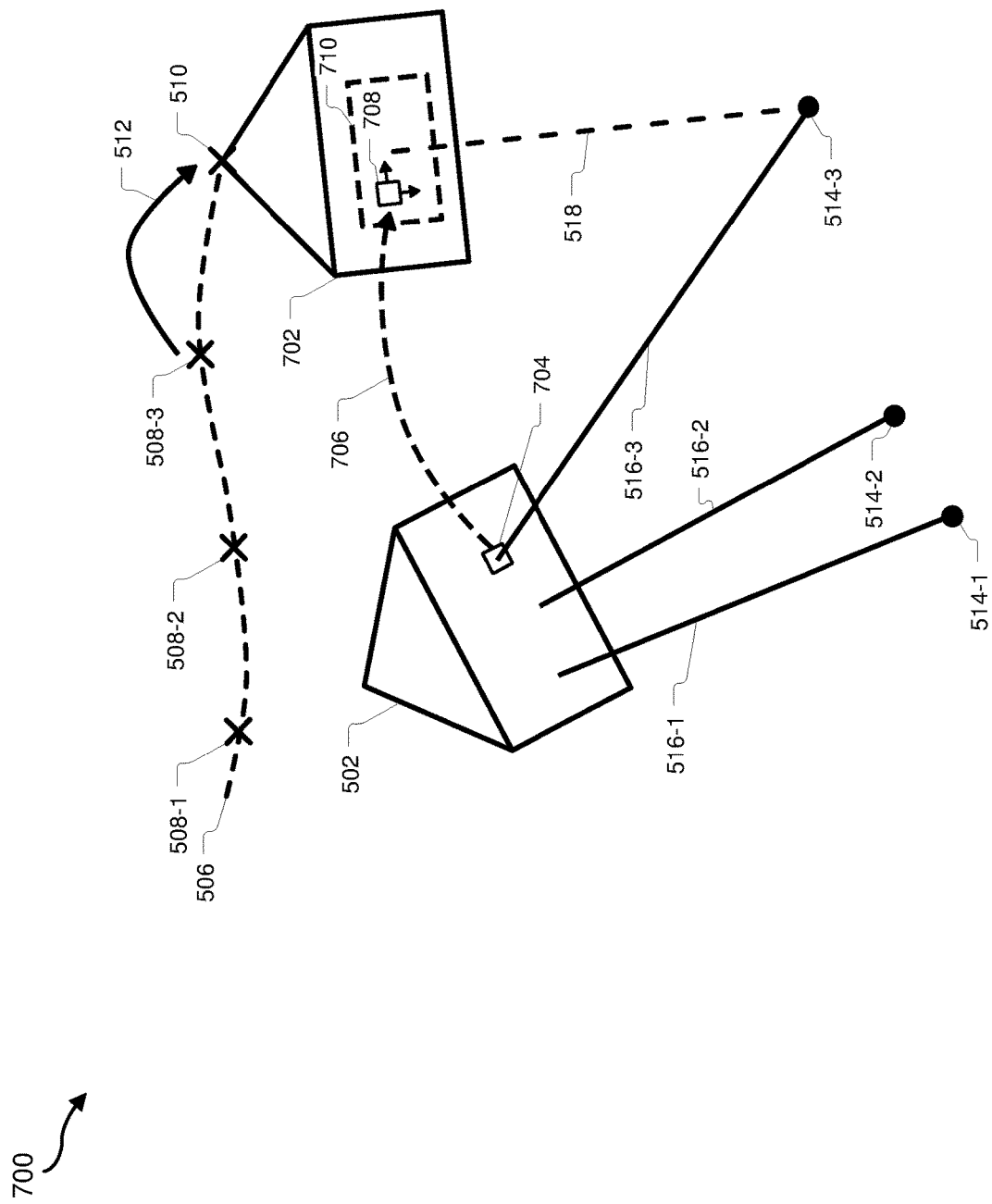
FIG. 7 illustrates an example of directing a hardware accelerator unit to execute a patch matching operation using a generated multi-scale representation of imaging data and a prepared set of input data.

By way of illustration, FIG. 7 illustrates an example view 700 of directing a hardware accelerator unit to execute a patch matching operation using a generated multi-scale representation of imaging data and a prepared set of input data. As shown, FIG. 7 includes many of the elements of FIG. 5. However, in FIG. 7, projected frame 504 has been replaced with current frame 702 that may represent an image (e.g., a two-dimensional image) included in imaging data 206. As further shown in FIG. 7, predicting module 108 has also warped a patch from a close keyframe (e.g., keyframe 502 and/or keyframe 606) towards current frame 702, as indicated by patch 704, arc 706, and warped patch 708. Although not shown in FIG. 7, in the example illustrated by FIG. 7, predicting module 108 has also computed a scale representation of imaging data 206 included in a multi-scale representation of current frame 702 (e.g., multi-scale representation 208), such as a level within an image pyramid included in the multi-scale representation, to utilize in a patch matching operation as described above.

Executing module 110 may direct hardware accelerator unit 154 to execute a patch matching operation in order to find a set of two-dimensional correspondences within current frame 702 for the set of points that preparing module 108 may have predicted to be visible within projected frame 504 (e.g., point 514-3). Executing module 110 may direct hardware accelerator unit 154 to execute the patch matching operation by directing hardware accelerator unit 154 to identify a search window 710 based on a predicted feature position associated with point 514-3. Using the computed scale representation (e.g., level of the image pyramid) of current frame 702, hardware accelerator unit 154 may then perform a convolution of warped patch 708 with a portion of the computed scale representation of current frame 702 included within search window 710. Hardware accelerator unit 154 may further compute a ZSSD score for points within search window 710 and warped patch 708. Hardware accelerator unit 154 may then identify a point within search window 710 having a ZSSD score lower than a predetermined threshold ZSSD score, and designate the point as a match to the position of the corresponding point 514 within current frame 702 (e.g., point 514-3). Hardware accelerator unit 154 may then store two-dimensional coordinates of the designated point.

In some examples, correspondences identified via a ZSSD score as described above may be imprecise because the ZSSD scoring may only be performed for pixel coordinates having integer values. Hence, in some examples, executing module 110 may direct hardware accelerator unit 154 to refine correspondences (e.g., identified and/or determined positions of points 514 within current frame 702) by directing hardware accelerator unit 154 to perform a subpixel alignment operation around the previously matched pixels. In some examples, the subpixel alignment operation may include a two-dimensional inverse compositional Lucas-Kanade optimization over an 8×8 patch. In other words, the Lucas-Kanade optimization may utilize an extracted sub-region (e.g., a window measuring five pixels by five pixels, eight pixels by eight pixels, eight sub-pixels by eight sub-pixels etc.) of the keyframe (e.g., keyframe 502) or the current frame (e.g., current frame 702) as a template in a two-dimensional inverse compositional Lucas-Kanade optimization. In some examples, the sub-pixel alignment operation may be further optimized, such as for two translation parameters and/or one illumination offset parameter.

Furthermore, as mentioned above, in some examples, executing module 110 may further direct hardware accelerator unit 154 to execute a corner detection operation. In some examples, a "corner detection operation" may be any operation that may identify a junction of two edges in an image, where an edge in an image may be denoted by a local discontinuity in brightness. In some examples, a corner detection operation may include, without limitation, a Harris corner detection operation, a Moravec corner detection operation, a Wang and Brady corner detection operation, and so forth.

As mentioned above, hardware accelerator unit 154 may execute these image-based tracking operations by executing one or more instructions included in an instruction set associated with hardware accelerator unit 154. For example, hardware accelerator unit 154 may be configured to efficiently execute various vector operations, such as multiplication (e.g., halfwords, word by half, vector reduce, and/or dual multiply), arithmetic and/or logical shifts on word and/or half-word data, automatic scaling, and so forth. Hardware accelerator unit 154 may utilize one or more of these efficient vector operations—and/or any other operations hardware accelerator unit 154 may be configured to perform—in order to execute one or more of the image-based tracking operations described above. Hence, one or more of tracking operations 212 may be efficiently implemented via hardware accelerator unit 154.

Figure 8:
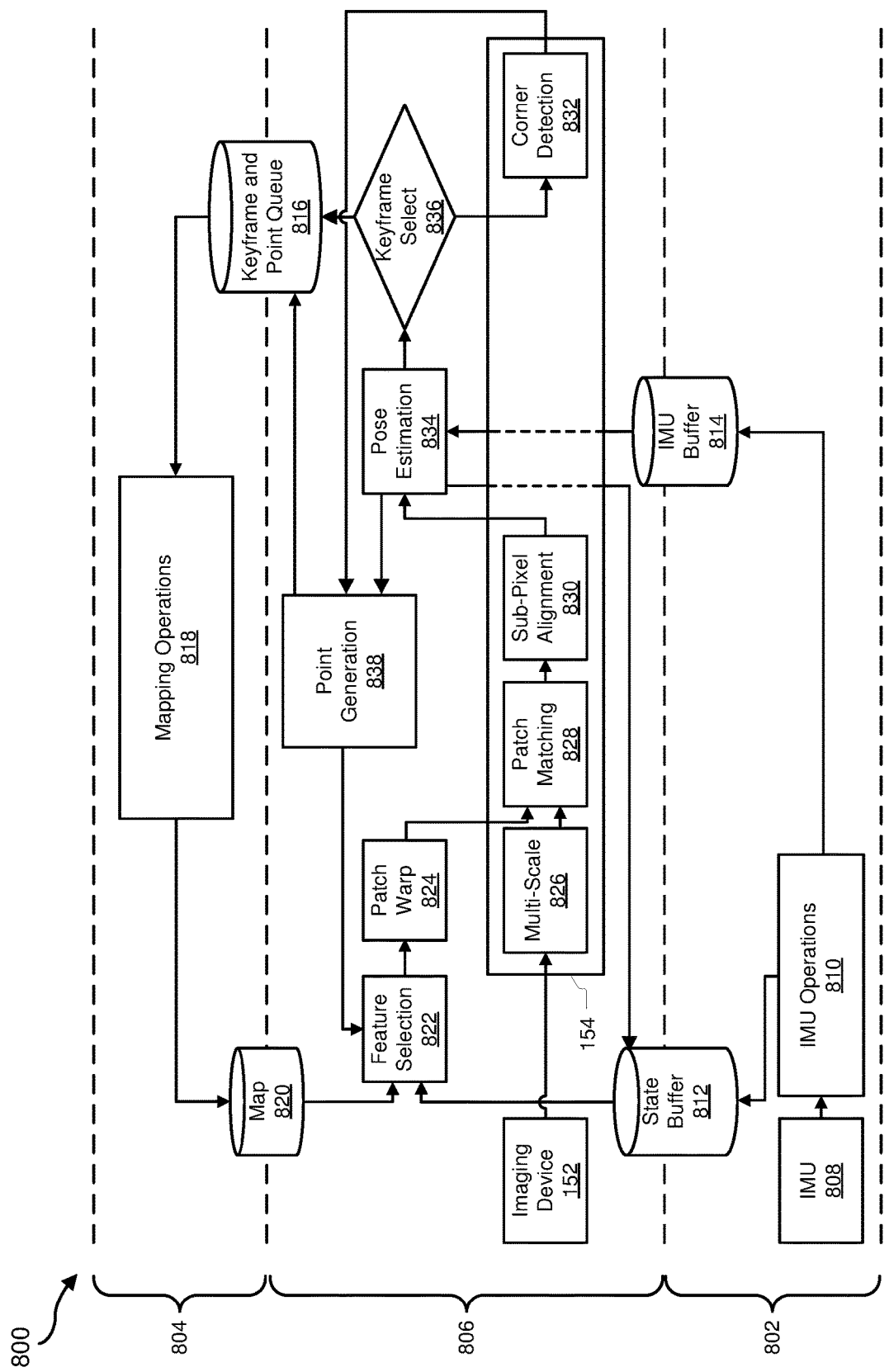
FIG. 8 is an operational flow diagram of an example implementation of an image-based tracking system that offloads image-based tracking operations from a general processing unit to a hardware accelerator unit.

FIG. 8 shows an operational flow diagram 800 of an example multi-threaded image-based tracking pipeline that may be executed by image-based tracking subsystem 140 wherein image-based tracking operations may be offloaded from a general processing unit (e.g., physical processor 130) to a hardware accelerator unit (e.g., hardware accelerator unit 154). As shown in FIG. 8, the multi-threaded image-based tracking pipeline may include three threads: an IMU thread 802, a mapper thread 804, and a tracker thread 806. In some examples, the threads may operate (e.g., be executed) at different clock speeds. For example, IMU thread 802 may operate at 1,000 Hz, mapper thread 804 may operate at a frequency of 5 Hz, and tracker thread 806 may operate at a frequency of a power source of image-based tracking subsystem 140 (e.g., 25 Hz, 30 Hz, etc.). By operating tracker thread 806 at a frequency of a power source of image-based tracking subsystem (e.g., a "mains" frequency of a country within which image-based tracking subsystem 140 is operated within), the systems and methods described herein may reduce and/or eliminate a degree to which some external factors (e.g., flicker from fluorescent lights within an environment) may interfere with operations of the image-based tracking system and/or an HMD.

IMU thread 802 may process measurements of an IMU, such as IMU 808. In some examples, IMU data collected by IMU 808, such as angular velocity, linear acceleration, and so forth of a tracked object (e.g., an HMD), may be subjected to one or more IMU operations 810 (e.g., integration of the IMU data with other gathered inertial data, filtering in accordance with one or more attitude and/or degree-of-freedom filters, etc.), and added to one or more intermediate buffers (e.g., state buffer 812 and/or IMU buffer 814).

Mapper thread 804 may receive keyframes and/or triangulated points from keyframe and point queue 816 and may execute one or more mapping operations 818 that may modify and/or update map 820. Mapping operations 818 may include any operations that may modify and/or update map 820 based on keyframes and/or points included in point queue 816. For example, mapping operations 818 may include, without limitation, adding new keyframes and points to map 820, optimizing one or more poses of the keyframes, determining and/or estimating normals of points included in keyframes (as described above in reference to FIGS. 6A and 6B), and/or copying map 820 to a suitable intermediary storage location in order to provide low latency for operations associated with tracker thread 806.

Map 820 may include data representative of and/or associated with identified, triangulated, and/or tracked locations of one or more points within an environment. For example, map 820 may include, without limitation, two-dimensional and/or three-dimensional positions of points within the environment, depths of points relative to an imaging device (e.g., imaging device 152), determined and/or estimated normals of identified and/or localized points, and so forth. Additionally, map 820 may include one or more keyframes that may include information representative of and/or used by an image-based tracking system (e.g., image-based tracking subsystem 140) to determine a location of one or more points within the environment. Map 820 may include any suitable data storage medium and/or any suitable data structure.

Tracker thread 806 may, via one or more of the systems described herein, perform one or more operations to process imaging data (e.g., imaging data 206). For example, one or more of the systems described herein (e.g., sending module 104) may cause imaging device 152 to send imaging data 206 to hardware accelerator unit 154. Although only one imaging device 152 may be shown in FIG. 8, imaging device 152 may be one of a plurality of imaging devices that may provide imaging data 206 and/or may send imaging data 206 to hardware accelerator unit 154.

Additionally, one or more of the systems described herein (e.g., preparing module 108) may prepare a set of input data (e.g., input data 210) for a set of image-based tracking operations (e.g., tracking operations 212). For example, as described above in reference to FIG. 5, preparing module 108 may, as indicated by feature selection 822, select a set of features expected to be included in the imaging data from imaging device 152 based on a pre-generated map of an environment (e.g., map 820) and a predicted pose of the imaging device (e.g., based on integrated IMU data received from IMU 808 and/or stored in state buffer 812). Additionally, as indicated at patch warp 824 and described in additional detail above in reference to FIGS. 6-7, one or more of the systems described herein (e.g., preparing module 108) may further prepare the set of input data by warping a patch of a keyframe based on (1) a relative pose of the imaging device (e.g., based on integrated IMU data included in state buffer 812 and/or keyframe data included in map 820), (2) a depth of an identified feature included in the keyframe (e.g., as included by map 820), and (3) a normal of a point included in the keyframe (e.g., as included in map 820).

As further indicated by graphical elements included within (e.g., bounded by) the representation of hardware accelerator unit 154 in FIG. 8, one or more of the systems described herein (e.g., generating module 106 and/or executing module 108) may direct hardware accelerator unit 154 to execute one or more operations. For example, as illustrated by multi-scale 826 and described above in reference to FIG. 4, generating module 106 may direct hardware accelerator unit 154 to generate a multi-scale representation (e.g., multi-scale representation 208) of the imaging data (e.g., imaging data 206) sent from imaging device 152 to hardware accelerator unit 154. Additionally, as described above in reference to FIG. 7, executing module 110 may direct hardware accelerator unit 154 to execute a set of image-based tracking operations using the generated multi-scale representation of the imaging data (e.g., multi-scale representation 208) and the prepared set of input data (e.g., input data 210). In some examples, the set of image-based tracking operations may include, without limitation, a patch matching operation, a sub-pixel alignment operation, and/or a corner detection operation, as indicated respectively by patch matching 828, sub-pixel alignment 830, and corner detection 832 in FIG. 8.

One or more of the systems described herein (e.g., one or more of modules 102) may perform a variety of additional operations as a part of tracker thread 806 in order to further process imaging data (e.g., imaging data 206). Unlike the operations executed by hardware accelerator unit 154 described above, in some examples, such operations may be executed via a general processing unit such as physical processor 130.

For example, at pose estimation 834, one or more of modules 102 may estimate a pose (e.g., a position and/or an orientation) of imaging device 152 and/or one or more tracked objects. Such an estimated pose, as well as additional IMU data and/or additional calibration data (e.g., data from IMU 808 and/or IMU operations 810), may be used to update state buffer 812. At keyframe select 836, one or more of modules 102 may select one or keyframes included in imaging data 206 to add to map 820, and may pass selected frames to keyframe and point queue 816 for processing by mapping thread 804 as described above.

As further shown in FIG. 8, one or more of the systems described herein (e.g., one or more of modules 102) may, as part of operations executed by tracker thread 804, further cause selected keyframes to be passed from keyframe select 836 to corner detection 832. One or more systems described herein (e.g., hardware accelerator unit 154 as directed by executing module 110) may then detect potential points included in the selected keyframes in any suitable way, such as in accordance with a corner detection operation as described above.

At point generation 838, one or more of the systems described herein may receive the detected corners, and may use one or more of the systems and/or methods described herein (e.g., one or more of modules 102) to find matches of detected points (e.g., points identified in one or more additional keyframes that may correlate to one or more points detected within the selected keyframes) and/or to triangulate detected points. One or more of the systems described herein may then cause generated (e.g., correlated and/or triangulated) points to be added to keyframe and point queue 816 for further processing by mapper thread 804 and/or for inclusion in map 820.

As discussed throughout the instant disclosure, the disclosed systems and methods may provide one or more advantages over traditional image-based tracking systems. For example, the systems and methods described herein may, via a general processing unit (e.g., physical processor 130), prepare a set of input data for a set of image-based tracking operations by selecting one or more features expected to be included in the imaging data and/or by warping a patch of a keyframe in preparation for a patch matching, sub-pixel alignment, and/or corner detection operation, and so forth.

Such preparation of input data by the general processing unit for image-based tracking operations may efficiently distribute computing tasks involved with image-based tracking operations among the general processing unit and a hardware accelerator unit that is configured (e.g., with a suitable instruction set, hardware architecture, and/or processing capabilities) to efficiently perform a set of image-based tracking operations (e.g., generating a multi-scale representation of imaging data 206, executing a patch matching operation, executing a sub-pixel alignment operation, executing a corner detection operation, etc.). For example, when provided with the prepared input data, a suitably configured hardware accelerator unit may be capable of performing the set of image-based tracking operations while consuming less power than the general processing unit. Therefore, the systems and methods described herein may result in more efficient usage of limited power resources of an image-based tracking system.

Additionally, by directing a hardware accelerator unit (e.g., hardware accelerator unit 154) that is capable of efficiently performing one or more image-based tracking operations (e.g., generating a multi-scale representation of imaging data 206, executing a patch matching operation, executing a sub-pixel alignment operation, executing a corner detection operation, etc.) to execute the image-based tracking operations as described above, the systems and methods described herein may offload computationally intensive image-based tracking operations from a general processing unit (e.g., physical processor 130) to the hardware accelerator unit. This may free up the general processing unit to perform other operations associated with providing an augmented reality experience to a user.

Moreover, in some examples, the systems and methods described herein may cause pixel data (e.g., imaging data 206) to remain in (e.g., be retained within memory associated with and/or memory included in) the hardware accelerator unit during execution of the image-based tracking operations. This may help to avoid costly (e.g., computationally intensive, bandwidth intensive, power intensive, etc.) input, output, pre-processing, and/or post-processing operations that may be associated with the hardware accelerator unit.

Finally, by causing a tracker thread in a multi-threaded image-based tracking system to operate at a frequency of a power source of the image-based tracking system (e.g., a "mains frequency" of a locality within which the image-based tracking system may be operated), the systems and methods described herein may reduce and/or eliminate a degree to which some external factors may interfere with operations of the image-based tracking system and/or an HMD. For example, by causing the tracker thread to operate at a mains frequency of the United States (e.g., 30 Hz) when the image-based tracking system is operated within the United States, the systems and methods described herein may reduce an amount that flicker from fluorescent lighting sources may interfere with operations of the image-based tracking system.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive imaging data to be transformed, transform the imaging data, output a result of the transformation to update a map of an environment, use the result of the transformation to determine a position and/or orientation of an object within an environment, and store the result of the transformation to track the position and/or orientation of the object within the environment over a period of time. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including, as described above, an HMD that may be connected to a host computer system, a standalone HMD, a mobile device or computing system, and/or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    sending imaging data from an imaging device to a hardware accelerator unit;
    directing the hardware accelerator unit to generate a multi-scale representation of the imaging data sent from the imaging device;
    preparing a set of input data for a set of image-based tracking operations that are configured to track a position of an object within an environment, the input data including an image of the environment and sensor data from one or more sensors; and
    directing the hardware accelerator unit to execute the set of image-based tracking operations using the generated multi-scale representation of the imaging data and the prepared set of input data, wherein the image data is loaded into hardware accelerator unit memory and is retained within the hardware accelerator unit memory during execution of the set of image-based tracking operations, and wherein the image-based tracking operations track the position of the object within the environment by:

identifying a predicted position for one or more points in the image of the environment that were predicted to be visible within the image based at least in part on the sensor data; and determining that the one or more points in the image are in the identified predicted position.

2. The computer-implemented method of claim 1, wherein the hardware accelerator unit comprises at least one of:
a digital signal processor (DSP); or
an application-specific integrated circuit (ASIC).

3. The computer-implemented method of claim 2, wherein the hardware accelerator unit is included in a system-on-a-chip (SoC) architecture.

4. The computer-implemented method of claim 1, wherein directing the hardware accelerator unit to generate the multi-scale representation of the imaging data sent from the imaging device comprises directing the hardware accelerator unit to generate an image pyramid based on the imaging data sent from the imaging device.

5. The computer-implemented method of claim 1, wherein the set of image-based tracking operations comprises at least one of:
a patch matching operation; or
a corner detection operation.

6. The computer-implemented method of claim 5, wherein the patch matching operation comprises a zero-mean sum-of-squares distance (ZSSD) patch matching operation.

7. The computer-implemented method of claim 5, wherein the corner detection operation comprises a Harris corner detection operation.

8. The computer-implemented method of claim 5, wherein the set of image-based tracking operations further comprises a subpixel alignment operation.

9. The computer-implemented method of claim 8, wherein the subpixel alignment operation comprises a two-dimensional inverse compositional Lucas-Kanade optimization.

10. The computer-implemented method of claim 1, wherein preparing the set of input data comprises selecting a set of features expected to be included in the imaging data based on a pre-generated map of an environment and a predicted pose of the imaging device.

11. The computer-implemented method of claim 10, wherein preparing the set of input data further comprises warping a patch of a keyframe based on a relative pose of the imaging device, a depth of an identified feature included in the keyframe, and a normal of a point included in the keyframe.

12. The computer-implemented method of claim 11, further comprising determining whether an estimate of the normal of the point included in the keyframe is within a predetermined threshold, wherein:

when the estimate of the normal of the point included in the keyframe is within the predetermined threshold, warping the patch of the keyframe is based on the estimate of the normal of the point included in the keyframe; and when the estimate of the normal of the point included in the keyframe is not within the predetermined threshold, warping the patch of the keyframe comprises determining the normal of the point included in the patch of the keyframe based on an anticipated orientation of a new frame included in the imaging data relative to the keyframe.

13. The computer-implemented method of claim 12, wherein warping the patch of the keyframe further comprises computing a scale representation of the imaging data included in the multi-scale representation of the imaging data to utilize in a patch matching operation.

14. The computer-implemented method of claim 1, wherein the hardware accelerator unit is configured to receive the imaging data from the imaging device, generate the multi-scale representation of the imaging data, and execute the set of image-based tracking operations as part of a set of operations performed by a tracker thread in a multi-threaded architecture.

15. The computer-implemented method of claim 14, further comprising executing the tracker thread at an operational frequency of an input power source.

16. A system comprising:
a head-mounted display (HMD) device comprising:
an imaging device; and
a hardware accelerator unit; and
an image-based tracking subsystem comprising:
a sending module, stored in memory, that sends imaging data from the imaging device to the hardware accelerator unit;
a generating module, stored in memory, that directs the hardware accelerator unit to generate a multi-scale representation of the imaging data sent from the imaging device;
a preparing module, stored in memory, that prepares a set of input data for a set of image-based tracking operations that are configured to track a position of an object within an environment, the input data including an image of the environment and sensor data from one or more sensors;
an executing module, stored in memory, that directs the hardware accelerator unit to execute the set of image-based tracking operations using the generated multi-scale representation of the imaging data and the prepared set of input data, wherein the image data is loaded into hardware accelerator unit memory and is retained within the hardware accelerator unit memory during execution of the set of image-based tracking operations, and wherein the image-based tracking operations track the position of the object within the environment by:
identifying a predicted position for one or more points in the image of the environment that were predicted to be visible within the image based at least in part on the sensor data; and
determining that the one or more points in the image are in the identified predicted position; and
at least one physical processor that executes the sending module, the generating module, the preparing module, and the executing module.

17. The system of claim 16, wherein the hardware accelerator unit comprises at least one of:
a digital signal processor (DSP); or
an application-specific integrated circuit (ASIC).

18. The system of claim 16, wherein the set of image-based tracking operations comprises at least one of:
a patch matching operation;
a corner detection operation; or
a sub-pixel alignment operation.

19. The system of claim 16, wherein the preparing module prepares the set of input data by:
- selecting a set of features expected to be included in the imaging data based on a pre-generated map of an environment and a predicted pose of the imaging device; and
- warping a patch of a keyframe based on a relative pose of the imaging device, a depth of an identified feature included in the keyframe, and a normal of a point included in the keyframe.

20. A non-transitory, computer-readable medium comprising computer-readable instructions that, when executed by at least one processor of a computing device, cause the computing device to:
- send imaging data from an imaging device to a hardware accelerator unit;
- direct the hardware accelerator unit to generate a multi-scale representation of the imaging data sent from the imaging device;
- prepare a set of input data for a set of image-based tracking operations that are configured to track a position of an object within an environment, the input data including an image of the environment and sensor data from one or more sensors; and
- direct the hardware accelerator unit to execute the set of image-based tracking operations using the generated multi-scale representation of the imaging data and the prepared set of input data, wherein the image data is loaded into hardware accelerator unit memory and is retained within the hardware accelerator unit memory during execution of the set of image-based tracking operations, and wherein the image-based tracking operations track the position of the object within the environment by:
  - identifying a predicted position for one or more points in the image of the environment that were predicted to be visible within the image based at least in part on the sensor data; and
  - determining that the one or more points in the image are in the identified predicted position.

* * * * *